(12) United States Patent
Kahikko et al.

(10) Patent No.: US 7,736,584 B2
(45) Date of Patent: Jun. 15, 2010

(54) METHOD FOR MANUFACTURING A MIXER-SETTLER AND MIXER-SETTLER

(75) Inventors: Antti Kahikko, Turku (FI); Timo Nivala, Espoo (FI)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 12/302,019

(22) PCT Filed: May 14, 2007

(86) PCT No.: PCT/FI2007/000130

§ 371 (c)(1),
(2), (4) Date: Nov. 22, 2008

(87) PCT Pub. No.: WO2007/135221

PCT Pub. Date: Nov. 29, 2007

(65) Prior Publication Data

US 2009/0152777 A1    Jun. 18, 2009

(30) Foreign Application Priority Data

May 22, 2006   (FI)   .................................. 20060498

(51) Int. Cl.
| | | |
|---|---|---|
| C22B 3/00 | (2006.01) | |
| C22B 13/08 | (2006.01) | |
| B29C 65/00 | (2006.01) | |
| B31B 1/60 | (2006.01) | |
| B32B 37/00 | (2006.01) | |
| B21D 39/03 | (2006.01) | |
| B23P 11/00 | (2006.01) | |
| B01J 19/00 | (2006.01) | |

(52) U.S. Cl. ........................... 266/170; 29/428; 29/524; 29/897.3; 29/897.31; 29/897.34; 156/60; 422/224

(58) Field of Classification Search ................... 29/428, 29/524, 897.3, 897.31, 897.34; 156/60; 266/170; 422/224; B01D 11/04; E04H 7/02; B01J 19/00
See application file for complete search history.

(56) References Cited

U.S. PATENT DOCUMENTS 5,457,919 A * 10/1995 Stultz et al. ............... 52/169.14
5,662,861 A *  9/1997 Taylor ........................ 266/170

FOREIGN PATENT DOCUMENTS

| DE | 8433117 | 8/1987 |
|---|---|---|
| FI | 974605 | 6/1999 |
| GB | 1242797 | 8/1971 |

* cited by examiner

*Primary Examiner*—Roy King
*Assistant Examiner*—Alexander Polyansky
(74) *Attorney, Agent, or Firm*—Chernoff, Vilhauer, McClung & Stenzel, LLP

(57) ABSTRACT

The invention relates to a method for manufacturing a mixer-settler used in hydrometallurgical metal processes, such as liquid-liquid extraction, and to a mixer-settler structure where chemically resistant material, such as plate-like wall elements made of reinforced plastic, is used.

20 Claims, 2 Drawing Sheets

METHOD FOR MANUFACTURING A MIXER-SETTLER AND MIXER-SETTLER

Figure 1:
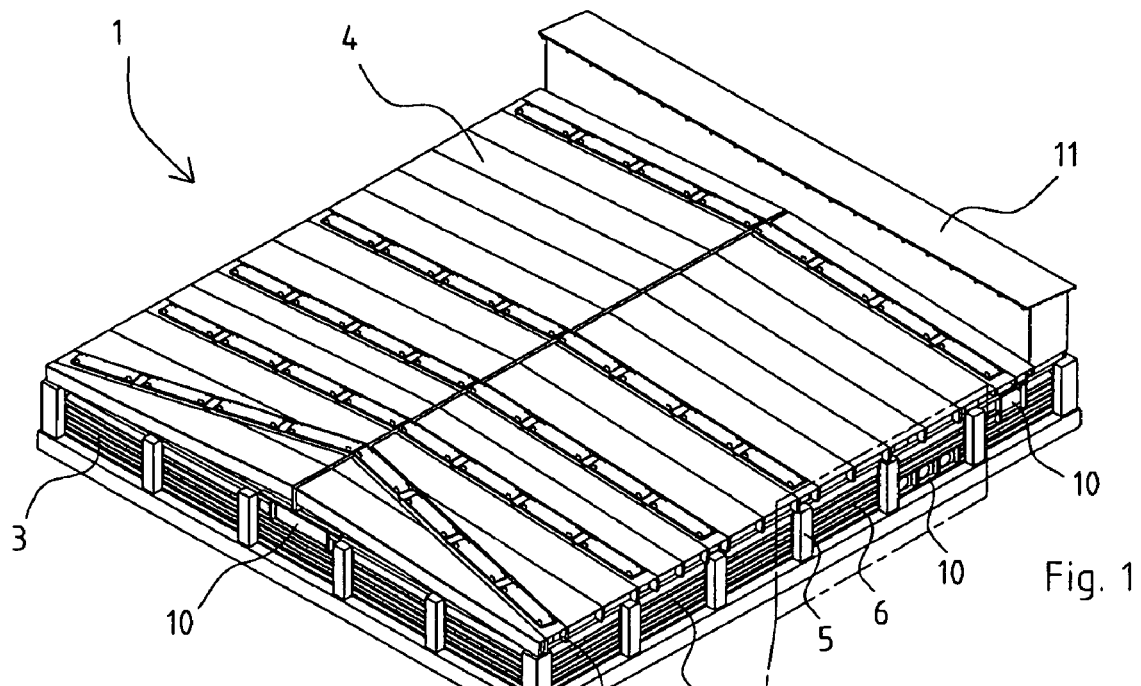

The invention relates to a method for manufacturing a mixer-settler used in the hydrometallurgical production of metals, and to the structure of a mixer-settler.

Liquid-liquid extraction is a step in the hydrometallurgic recovery of metals after leaching the ore. In liquid-liquid extraction, organic reagent solution is mixed in a mixer-settler to an aqueous solution, containing the substance to be purified and concentrated in a soluble form, metal usually in ion form or as a complex with numerous impurities. The valuable metal or substance to be refined reacts selectively with the organic extraction chemical, in which case it can be separated as pure from the aqueous solution into the extraction chemical. Thus a valuable metal or substance can thereafter be separated by a chemical reaction, reversed to extraction, from the organic solution back to the aqueous solution (backextraction), from where it can be further recovered as a product for example by precipitation, by reduction or by electrolytic means to a metal. Conventionally a mixer-settler has been made of concrete and provided with a chemically resistant coating, such as HDPE-coating. The coating must be repaired from time to time, which causes extra maintenance operations in the mixer-settler.

The purpose of the arrangement according to the invention is to realize a mixer-settler structure that is both chemically and structurally resistant, to be used in connection with hydrometallurgical metal processes, such as liquid-liquid extraction.

By means of the solution according to the invention, the mixer-settler is easily installed, and owing to the characteristic novel wall structure, the mixer-settler combines both the chemical and structural resistance required of a mixer-settler. According to the invention, a mixer-settler used in hydrometallurgical metal processes, such as liquid-liquid extraction, is manufactured as follows. A mixer-settler with an essentially rectangular bottom is manufactured of vertical wall structures that are in contact with the solution and of a concrete bottom plate that is cast to be inclined in the flowing direction of the solution, as well as of a cover structure, so that the wall structures are connected to the bottom plate, whereafter the cover structure is installed on top of the wall structures. According to the invention, the wall structures are connected by vertical support columns to the bottom plate, and the wall structure is formed by attaching to the vertical support columns a required number of horizontal support beams at regular intervals, to which horizontal support beams there are attached a required number of plate-like wall elements made of a chemically resistant material inside the mixer-settler, so that they form a load-bearing structure in the spaces left between the horizontal support beams, and said plate-like wall elements are then connected to the plate-like element covering the bottom plate of the mixer-settler. The plate-like wall elements of the wall structure are advantageously made of reinforced plastic, and they form a load-bearing structure in the spaces left between the horizontal support beams of the wall structure, thus supporting the solution in the tank, in which case the wall structure need not be completely lined by for example concrete. As the material of the plate-like wall elements, reinforced plastic such as fiberglass reinforced plastic, is easily installed and both chemically and structurally resistant. By using the arrangement according to the invention, there is achieved a mixer-settler structure that is advantageous both in installation features and manufacturing costs.

According to a preferred embodiment of the invention, reinforced plastic is used as the material of the plate-like wall element, of the plate-like element covering the bottom plate and of the cover structure, in which case there is achieved an advantageous, resistant mixer-settler structure, and a separate coating is not needed in the tank. According to an embodiment of the invention, the horizontal support beams are made of steel. According to another preferred embodiment of the invention, the plate-like wall elements of the wall structure are attached to the horizontal support beams by laminating. Thus there is obtained an advantageous, solid arrangement for the wall structure. According to the invention, the cover structure is installed as a compact, load-bearing structure on top of the wall structures, and in between the wall structures and the cover structure, there can be installed means, such as support beams, for supporting the cover structure.

According to a preferred embodiment of the invention, the plate-like wall elements in the wall structure are identical in height. According to an embodiment, the plate-like wall element of the wall structure extends at the bottom edge underneath the inner surface of the bottom plate, at least in part of the mixer-settler edges. According to the invention, the plate-like wall element of the wall structure is connected to the plate-like element covering the bottom plate by laminating in the corner of the mixer-settler, so that there is created a rounded corner.

The essential novel features of the invention are apparent from the appended claims.

DRAWINGS

Figure 2:
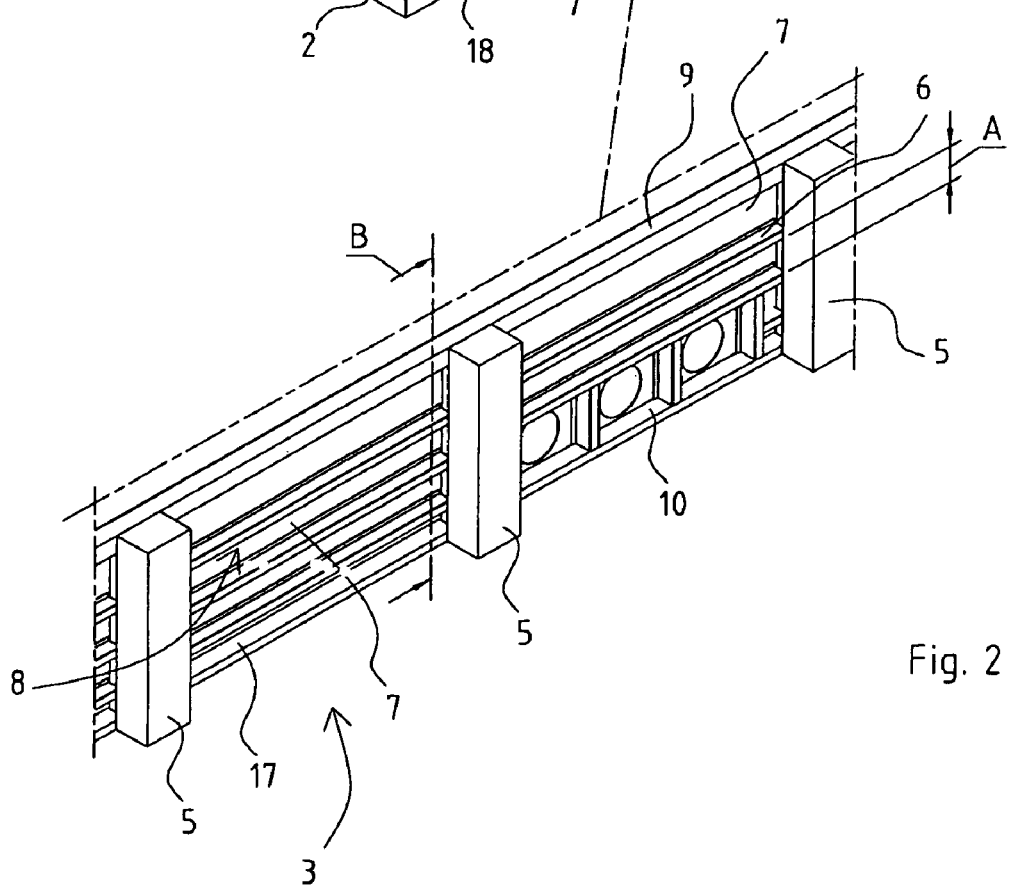
Figure 3:
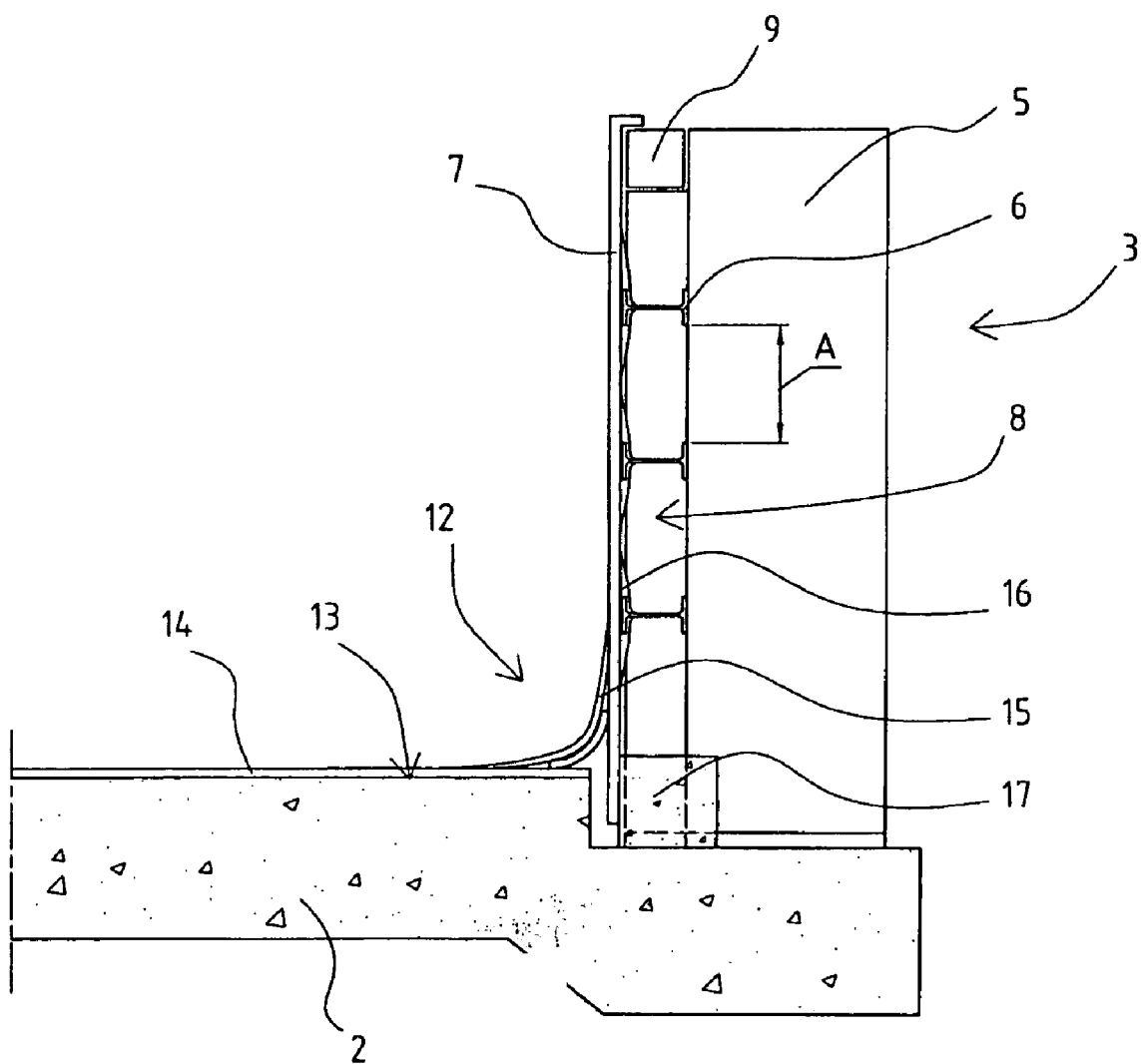

The equipment according to the invention is described in more detail with reference to the appended drawings, wherein FIG. 1 illustrates a mixer-settler according to the invention, seen from the top, FIG. 2 illustrates the wall structure of a mixer-settler according to the invention, and FIG. 3 illustrates a cross-section of the wall structure of a mixer-settler according to the invention.

A mixer-settler structure according to the invention is illustrated in FIGS. 1, 2 and 3. FIG. 3 is a cross-section of FIG. 2, seen at point B. The solution treated in the mixer-settler 1 flows during the process, so that the desired metal is separated from the solution. Thus the concrete bottom plate 2 of the mixer-settler is cast to be inclined in the solution flowing direction, so that the bottom plate is higher at that end where the solution is fed in the mixer-settler. As regards the structure of the mixer-settler 1, requirements set forth by the extraction solution circulation must be taken into account, and the mixer-settler must be both chemically and structurally resistant. A mixer-settler 1 with an essentially rectangular, edgy bottom is manufactured of vertical wall structures 3 that get into contact with the solution, of an inclined bottom plate 2 cast of concrete, as well as of a cover structure 4. The wall structures 3 are connected by vertical support columns 5 to the bottom plate 2, whereafter the cover structure 4 is installed on top of the wall structures 3. The cover structure 4 is attached to the topmost wall structures 3 in a sealed fashion, in order to prevent gases that are hazardous for the process surroundings from escaping from the mixer-settler.

The vertical support columns 5 are attached to the bottom plate 2 for instance by casting. The wall structure 3 of the mixer-settler 1 is formed by attaching to the vertical support columns 5 at regular intervals A horizontal support beams 6, for example steel beams, to which the plate-like wall elements 7 made of chemically resistant material are fastened, so that they extend throughout the whole interior of the mixer-settler 1, forming a load-bearing structure in the spaces 8 left between the horizontal support beams 6. Each wall structure 3 contains a number of horizontal support beams 6, specific to each mixer-settler application, for example three beams, and a number of vertical support columns 5, specific to each mixer application, for example five support columns. The thickness of for example the plate-like wall element 7 of the wall structure 4 is preferably 6-15 millimeters, and the thickness of the plate-like element 14 covering the bottom plate 2 is preferably 3-7 millimeters. The plate-like wall elements 7 are connected at the corner 12 of the mixer-settler 1 to the plate-like element 14 covering the bottom plate 2. The plate-like wall elements 7 of the wall structure 3 are made of reinforced plastic, such as fiberglass reinforced plastic (FRP) or HDPE plastic, and they are mutually attached at the vertical support columns 5 for instance by laminating or by some other corresponding means, so that a liquidproof sealing is obtained. The plate-like wall elements 7 made of glass fiber are identical in height. Thus the whole interior of the mixer-settler 1, bearing the solution, is lined with reinforced plastic plates. According to the invention, the plate-like elements 14 covering the bottom plate are also made of reinforced plastic. The horizontal support beams 6 made of steel, for example, are attached to the vertical support columns 5, and the plate-like wall elements 7 are attached to the horizontal support beams 6 by a laminated bond 16. The plate-like wall elements 7 in part bear the pressure caused by the liquid contained in the tank, for that part of the wall structure 3, where there are no horizontal support beams 6, i.e. in the spaces 8 left therebetween. The topmost horizontal support beam 9 in part also bears the weight of the cover structure 4.

FIG. 3 illustrates the angle 12 formed by the bottom plate 2 and the wall structure 3 in the corner of the mixer-settler 1. At the bottom edge, the plate-like wall element 7 provided in the wall structure 3 extends underneath the inner surface 13 of the bottom plate 2, at least on that side of the mixer-settler 1 where the inner surface 13 of the bottom plate is higher than the inner surface of the opposite end. Thus it is possible to use in the wall structure 3 plate-like wall elements 7 that are identical in height, which is advantageous for the manufacturing technique. The inner surface of the mixer-settler 1 that bears the whole solution to be processed is covered by reinforced plastic plates. In the corner of the tank 12, in between the plate-like wall element 7 of the wall structure 3 and the plate-like element 14 covering the bottom plate 2, there is installed a rounded piece cut of reinforced plastic pipe, in order to form a rounded angle 12 in the tank. Thus the solids contained in the solution flow are not so easily accumulated at the tank corners, and there is obtained an arrangement that is advantageous from the point of view of circulation technology. The plate-like element 14 covering the bottom plate 2 is connected to the plate-like wall element 7 of the wall structure 3 for instance by making a laminated bond 15 in the tank corner 12. In the bottom plate 2, underneath the wall structure 3, there is cast a concrete beam 17 that binds the bottom edge of the wall structure 3 to the bottom plate 2.

The cover structure 4 of the mixer-settler is composed of support beams 18 installed on top of the wall structure 3, and of chemically and structurally resistant plate-like reinforced plastic elements installed on top of said support beams, which elements are bolted to the support beams. The support beams are made of glulam, for example. The cover structure 4 is provided with banisters as well as check-up and maintenance doors, and the cover structure is inclined, so that rain water can freely flow away from the surface of the cover structure.

The cover structure is designed to be a load-bearing structure, so that the mixer-settler can be maintained from the cover structure, and it is not necessary to build separate maintenance platforms, neither below the cover structure nor around the mixer-settler. The wall structure of the mixer-settler includes pre-made conduits 10 for inflowing and outflowing solution. In addition, the mixer-settler is provided with a working desk 11 for adjusting the extraction process.

The invention is not restricted to the above described embodiments only, but many modifications and combinations thereof are possible within the scope of the inventive idea contained in the appended claims.

The invention claimed is:

1. A method for manufacturing a mixer-settler used in hydrometallurgical metal processes, where the bottom of the mixer-settler is essentially rectangular, and the mixer-settler is compiled of vertical wall structures that get into contact with a solution, of a bottom plate that is cast of concrete to be inclined in the solution flowing direction, and of a cover structure, the method comprising connecting the wall structures whereafter to the bottom plate, whereafter the cover structure on top of the wall structures, connecting the wall structures by vertical support columns to the bottom plate, fastening a plurality of horizontal support beams to the vertical support columns at regular intervals, to form a wall structure, attaching a required number of plate-like wall elements made of a chemically resistant material to the horizontal support beams inside the mixer-settler, so that they form a load-bearing structure in the spaces left between the horizontal support beams, said plate-like wall elements being connected to the plate-like element covering the bottom plate of the mixer-settler.

2. A method according to claim 1, wherein the plate-like wall element is made of reinforced plastic.

3. A method according to claim 1, wherein the plate-like element covering the bottom plate is made of reinforced plastic.

4. A method according to claim 1, wherein the horizontal support beams are made of steel.

5. A method according to claim 1, wherein the plate-like wall elements of the wall structure are attached to the horizontal support beams by laminating.

6. A method according to claim 1, wherein the cover structure is installed as a compact load-bearing structure on top of the wall structures.

7. A method according to claim 1, wherein the cover structure is at least partly made of reinforced plastic.

8. A method according to claim 1, wherein in between the cover structure and the wall structures, there are installed means for supporting the cover structure.

9. A method according to claim 1, wherein the plate-like wall elements provided in the wall structure are identical in height.

10. A method according to claim 1, wherein at the bottom edge, the plate-like wall element of the wall structure extends to underneath the inner surface of the bottom plate, at least in part of the edges of the mixer-settler.

11. A method according to claim 1, wherein the plate-like wall element of the wall structure is connected to the plate-like element covering the bottom plate in the corner of the mixer-settler by laminating, so that there is formed a rounded angle.

12. A mixer-settler to be used in hydrometallurgical metal processes, said mixer-settler with an essentially rectangular bottom comprising vertical wall structures that get into contact with the solution, a concrete bottom plate cast to be inclined in the solution flowing direction, said wall structures being supported against the bottom plate, as well as a cover structure that is installed on top of the wall structures, wherein the wall structures are supported by vertical support columns against the bottom plate, and to the vertical support columns of the wall structure, there are attached a required number of horizontal support beams at regular intervals, to which horizontal support beams there are attached a required number of plate-like wall elements made of chemically resistant material, extending throughout the whole interior of the mixer-settler, thus forming a load-bearing structure in the spaces left between the horizontal support beams, said plate-like wall elements being connected to the plate-like element covering the bottom plate of the mixer-settler.

13. A mixer-settler according to claim 12, wherein the wall structure includes at least three horizontal support beams and at least three vertical support columns.

14. A mixer-settler according to claim 12, wherein the plate-like wall element is made of reinforced plastic.

15. A mixer-settler according to claim 12, wherein the plate-like element covering the bottom plate is made of reinforced plastic.

16. A mixer-settler according to claim 12, wherein the horizontal support beams are made of steel.

17. A mixer-settler according to claim 12, wherein the thickness of the plate-like wall element of the wall structure is 6-15 millimeters.

18. A mixer-settler according to claim 12, wherein the thickness of the plate-like element covering the bottom plate is 3-7 millimeters.

19. A mixer-settler according to claim 12, wherein the cover structure is at least partly made of reinforced plastic.

20. A mixer-settler according to claim 12, wherein in a corner of the mixer-settler there is provided a laminated bond between the plate-like wall element of the wall structure and the plate-like element covering the bottom plate.

* * * * *

UNITED STATES PATENT AND TRADEMARK OFFICE
CERTIFICATE OF CORRECTION

PATENT NO.       : 7,736,584 B2
APPLICATION NO.  : 12/302019
DATED            : June 15, 2010
INVENTOR(S)      : Antti Kahikko It is certified that error appears in the above-identified patent and that said Letters Patent is hereby corrected as shown below:

Claim 1, Col. 4 line 21, "whereafter to the bottom plate, whereafter" should read --to the bottom plate, installing--

Claim 1, Col. 4 line 26, "required number" should read --plurality--

Signed and Sealed this

Third Day of August, 2010

David J. Kappos
*Director of the United States Patent and Trademark Office*